United States Patent [19]

Doll

[11] Patent Number: 5,044,411
[45] Date of Patent: Sep. 3, 1991

[54] LAWNMAKER TIRE COVER

[76] Inventor: Richard Doll, 626 Niver Ave., Northglenn, Colo. 80221

[21] Appl. No.: 538,748

[22] Filed: Jun. 15, 1990

[51] Int. Cl.$^5$ ............................................. B60C 11/02
[52] U.S. Cl. ...................................... 152/208; 156/96
[58] Field of Search ............... 152/173, 175, 177, 179, 152/170, 185, 187, 189, 190, 208, 218, 450, DIG. 14, DIG. 15; 156/95, 96, 112, 128.1, 128.6, 130, 909; 428/40, 41

[56] References Cited

U.S. PATENT DOCUMENTS

| 841,155 | 1/1907 | Kelly. | |
|---|---|---|---|
| 1,403,385 | 1/1922 | Burt | 152/189 |
| 1,489,432 | 7/1924 | Gallemore. | |
| 2,682,907 | 7/1954 | Krueger | 152/208 X |
| 3,039,509 | 6/1962 | Gruber | 156/95 X |
| 3,224,483 | 12/1965 | Gross et al. | 156/96 X |
| 3,945,871 | 3/1976 | Schelkmann | 156/289 |
| 4,524,095 | 6/1985 | Gockel et al. | 428/40 X |

FOREIGN PATENT DOCUMENTS

| 0222115 | 3/1958 | Australia | 156/96 |
|---|---|---|---|
| 0584295 | 9/1959 | Canada | 156/96 |

Primary Examiner—Michael W. Ball
Assistant Examiner—Nancy T. Krawczyk
Attorney, Agent, or Firm—Terry M. Gernstein

[57] ABSTRACT

A cover is used to replace worn tread of a lawnmower tire without requiring replacement of the entire wheel and tire unit. The cover includes a sidewall section formed of nylon stretch material, and a tread section formed of rubber or the like. Pressure sensitive adhesive covers essentially the entire inner surface of the tread section and affixes the cover to the tire being retread when forced against the tread section of that tire. Backing material is in sections and covers the adhesive for storage. One of the sections is approximately ninety degrees in arc length.

7 Claims, 3 Drawing Sheets

LAWNMAKER TIRE COVER

TECHNICAL FIELD OF THE INVENTION

The present invention relates to the general art of land vehicles, and to the particular field of wheels and tires for land vehicles.

BACKGROUND OF THE INVENTION

Many lawns are mowed using a powered mower of some sort. These powered mowers can be electric or internal combustion driven, but all have some form of ground-engaging wheels and tires to which a motor or an engine is drivingly connected.

As with any powered vehicle or machine, the driven wheels must establish traction with the ground in order to propel the vehicle. In the case of a lawnmower, slipping of the tires on the driven wheels can damage the lawn, create problems of mower control, or at least increase the time required to complete a mowing job. Slipping or spinning of the driven wheels can also create special problems on hills or on uneven terrain, especially on the uphill portion of such terrain.

Spinning of any driven wheel can often be traced to worn tread on the tire of that wheel, and spinning may increase tire wear worsening the situation.

Heretofore, the most common solution to the problems associated with worn treads on lawnmower tires has been to simply replace the entire wheel and tire. This solution may be costly, time consuming and unnecessary since the wheel, its hub, its rim and the other parts thereof may still be perfectly good, with only the tire tread being worn out.

While the art contains examples of means and methods for retreading automobile or truck tires, such means and methods are generally too complex, costly and difficult to be applied to a small and simple lawnmower wheel. Given the choice of using such complicated retreading methods or buying an entirely new lawnmower tire and wheel, most consumers will opt to simply purchase an entirely new lawnmower wheel and tire.

The above-discussed situations are applicable to nearly any small wheel, such as might be found on a tiller or other such home-use agricultural implement.

Accordingly, there is a need for a means for retreading small tires, especially lawnmower tires, which is easily used and which is inexpensive to purchase and does not require any special equipment or methodology.

OBJECTS OF THE INVENTION

It is a main object of the present invention is to provide a means for retreading small tires.

It is another object of the present invention to provide a means for retreading small tires, especially lawnmower tires.

It is another object of the present invention to provide a means for retreading small tires, especially lawnmower tires, which is easily used.

It is another object of the present invention to provide a means for retreading small tires, especially lawnmower tires, which easily used and which is inexpensive to purchase.

It is another object of the present invention to provide a means for retreading small tires, especially lawnmower tires, which easily used and which is inexpensive to purchase and does not require any special equipment or methodology.

SUMMARY OF THE INVENTION

These, and other, objects are achieved by a one-piece cover which includes a sidewall section adapted to snugly engage a sidewall section of a tire being retread, and a tread section adapted to cover the worn tread section of the tire being retread. A tread is located on the outside surface of the cover tread section and adhesive is located on the inside surface of the cover tread section. The adhesive affixes the cover tread section to the tire tread section.

The cover also includes backing strips releasably adhered to the cover adhesive. These strips are removed to expose the cover adhesive. The strips are sized so that one strip covers an arc of approximately ninety degrees about the inner circumference of the cover. This short strip is removed, and the exposed adhesive is used to temporarily attach the cover to the wheel. Once the cover is aligned in the position desired, the remaining backing strip section is removed, and the cover is placed on the tire being retread. If the backing were one piece instead of in strips, it might be difficult to properly orient the cover on a tire.

BRIEF DESCRIPTION OF THE DRAWING FIGURES

DETAILED DESCRIPTION OF THE PREFERRED EMBODIMENT OF THE INVENTION

Figure 1:
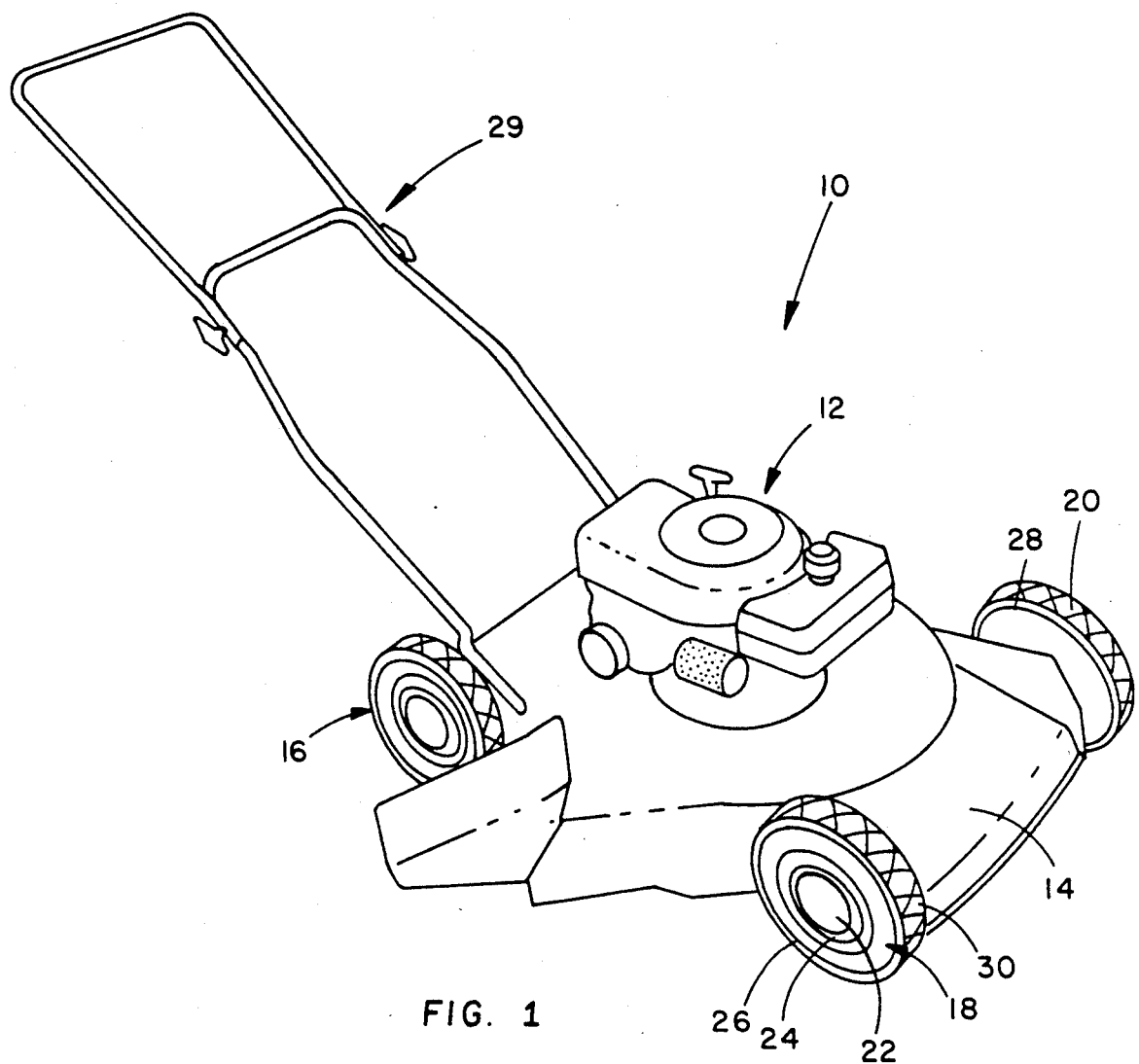
FIG. 1 is a perspective view of a typical power lawnmower which can incorporate the cover embodying the present invention.

Shown in FIG. 1 is a typical powered lawnmower 10 which is often used by many people to cut their lawn. The lawnmower 10 includes an engine section 12 mounted on a housing 14 and which is drivingly connected to driven wheels, such as rear wheel 16. The lawnmower also includes front wheels 18 and 20, having hubcaps, such as hubcap 22 on the wheel section 24, and a tire section 26 surrounding the wheel section. A height adjuster 28 is also connected to the wheels, and the lawnmower is pushed using a handle 29.

As can be seen in FIG. 1, each tire has tread, such as tread 30 on the ground-engaging surface thereof. As this tread becomes worn, the mower may have a tendency to slip, especially on uneven terrain.

Accordingly, the present invention is embodied in a cover that can be used to retread such worn tires without requiring the replacement of the entire wheel and tire unit.

Figure 2:
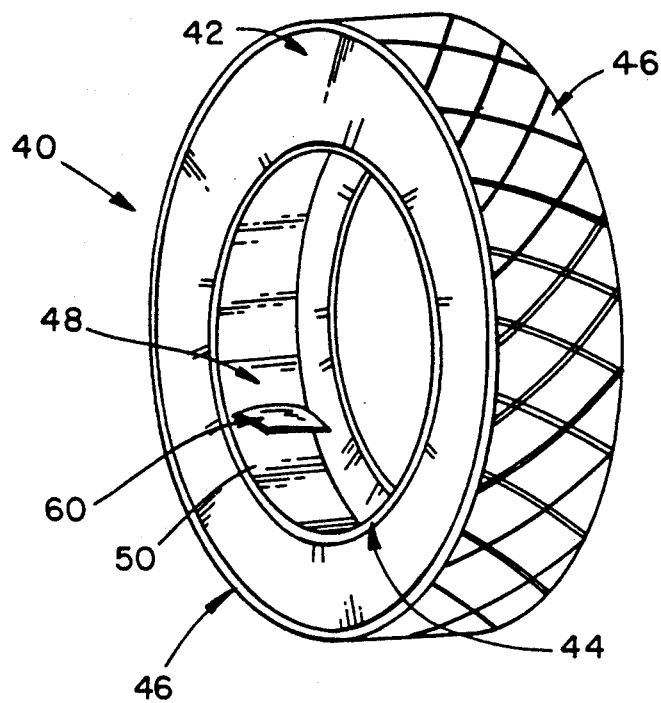
FIG. 2 is a perspective view thereof.
Figure 3:
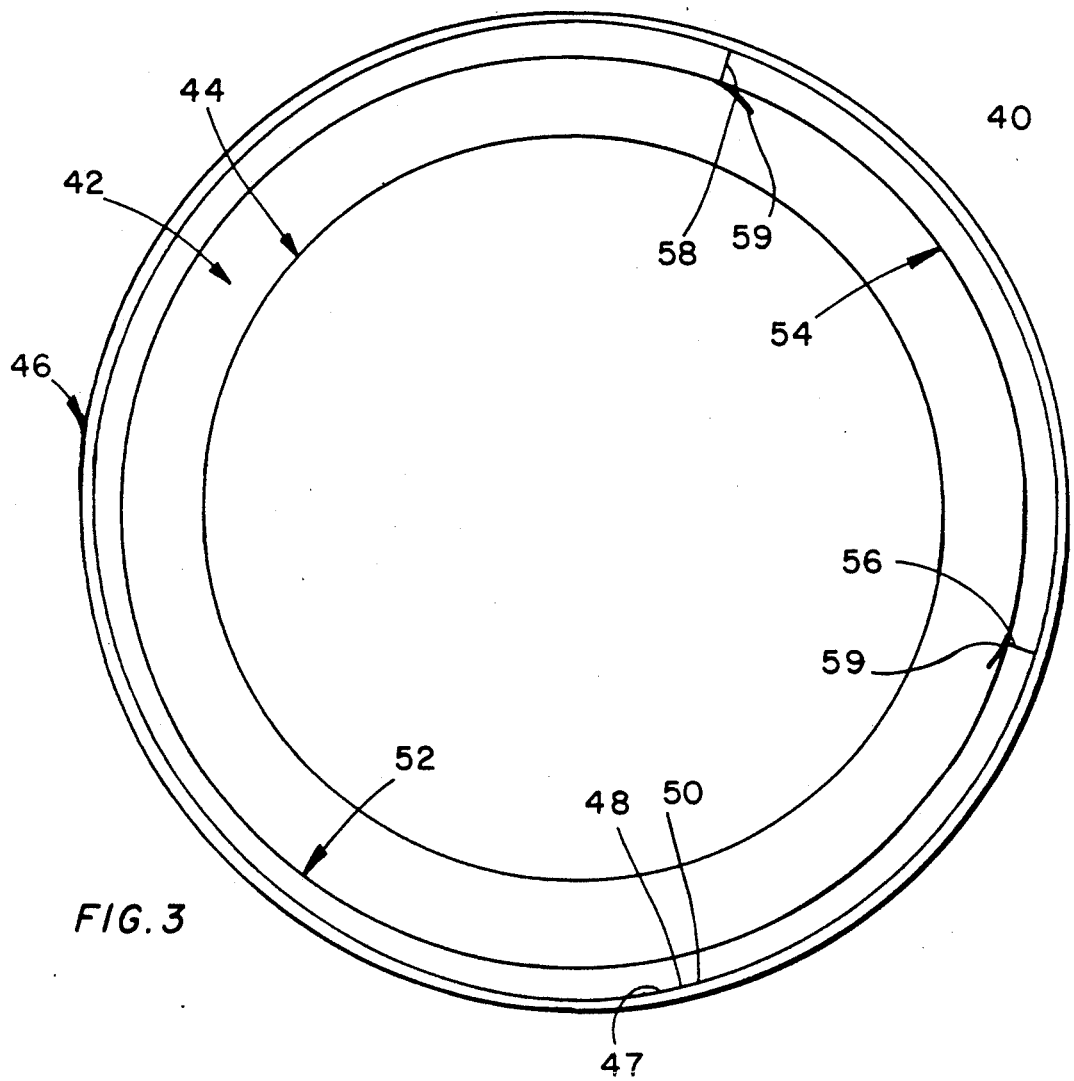
FIG. 3 is a side elevational view thereof.

The cover 40 is best shown in FIGS. 2 and 3, and reference is now made to such figures. As shown, the cover 40 is one-piece so it does not have a tendency to rip or tear once it is placed on the tire and as it is being stretched and deformed during placement on the tire. The cover 40 is stretchable so it can be placed over a lawnmower tire in situ, and includes an annular sidewall portion 42 which is formed of nylon stretch material and which has an inner edge 44, formed of stretch cord, and an outer edge 45. The sidewall portion 42 is sized and oriented to cover essentially the entire sidewall portion of the tire, with the hub of the wheel being located within the opening defined by the inner edge 44. Due to this arrangement, the cover 40 needs only to be stretched over an in situ wheel and tire assembly without even requiring that in situ wheel and tire assembly to be removed from the lawnmower. Of course, the wheel and tire assembly can be removed if desired.

The cover 40 also includes a tread portion 46, that is formed of rubber, or other materials used in lawnmower tire treads, and has an appropriate pattern of treads. The tread portion 46 is attached to the outer edge 45 of the sidewall portion and is adapted to snugly engage the tread portion of the tire being retread.

The tread of the tread portion is located on the outer surface of the tread portion, and that tread portion also includes an inner surface 47 which will engage the outer surface of the tire tread of the tire being retread. The cover also includes a synthetic adhesive, such as pressure-sensitive adhesive 48 covering essentially the entire inner surface 47 of the cover tread portion. This adhesive is the type that will securely bond the cover to the tread of the tire being retread when the in situ tire tread contacts the cover adhesive. No adhesive is located on the inner surface of the sidewall section of the cover so the cover will be easy to manipulate into a desired and proper position on the tire being retread.

The cover also includes backing material 50 covering the adhesive when the cover is being stored prior to application to a tire. The backing material is waxy type material such as commonly used to cover and protect adhesive. This material is peeled off of the adhesive to expose the adhesive, and the cover 40 is then applied to the tire being retread.

To ease the manipulation of the cover onto a wheel, especially a wheel that is still mounted on a lawnmower, the backing material is divided into sections 52 and 54 separated by edges 56 and 58 with an overlapping portion 59 on each of the covers that will form the tab for that cover. The section 54 extends for ninety degrees, or one quadrant, of the inner circumference of the cover, and each of the sections includes a tab, such as tab 60 which is grasped to pull the backing section off of the adhesive 48. The overlapping portions form the tabs.

Section 54 is removed first, and the adhesive-covered inner surface 47 of the cover tread section is applied to the outer surface of the tire tread of the tire being retread. Since this section of the cover is relatively small, the cover can be manipulated into the desired orientation and position on the tire. If section 54 is smaller than ninety degrees, insufficient adhesive will be exposed to hold the cover in place during the initial placement of the cover onto the tire; whereas, if the section 54 is more than ninety degrees, too much adhesive will be exposed and it may be difficult to maneuver the cover 40 into the desired orientation and position after adhering the adhesive covered by this section 54 to the tire. Once the cover is in a desired position and orientation on the tire, the backing section 52 is removed and the rest of the cover 40 is applied to the lawnmower tire. The tread section is pressed against the tire tread section to secure the adhesive, and a fully treaded tire is produced.

Since the lawnmower wheel is not subject to the same wear and severe conditions as is a truck or automobile tire, and since loosening of the cover 40 from the tire is not as dangerous as loosening of a retread from an automobile or truck tire, the bonding of the cover 40 to the tire need not be as secure as would be the case in an automobile or truck tire.

Figure 5:
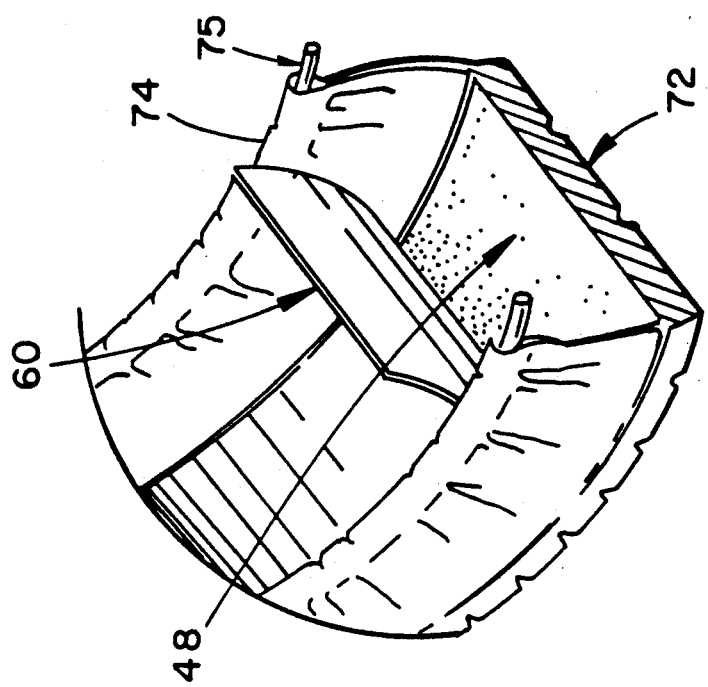
FIG. 5 is a sectional view of the alternative form.
Figure 4:
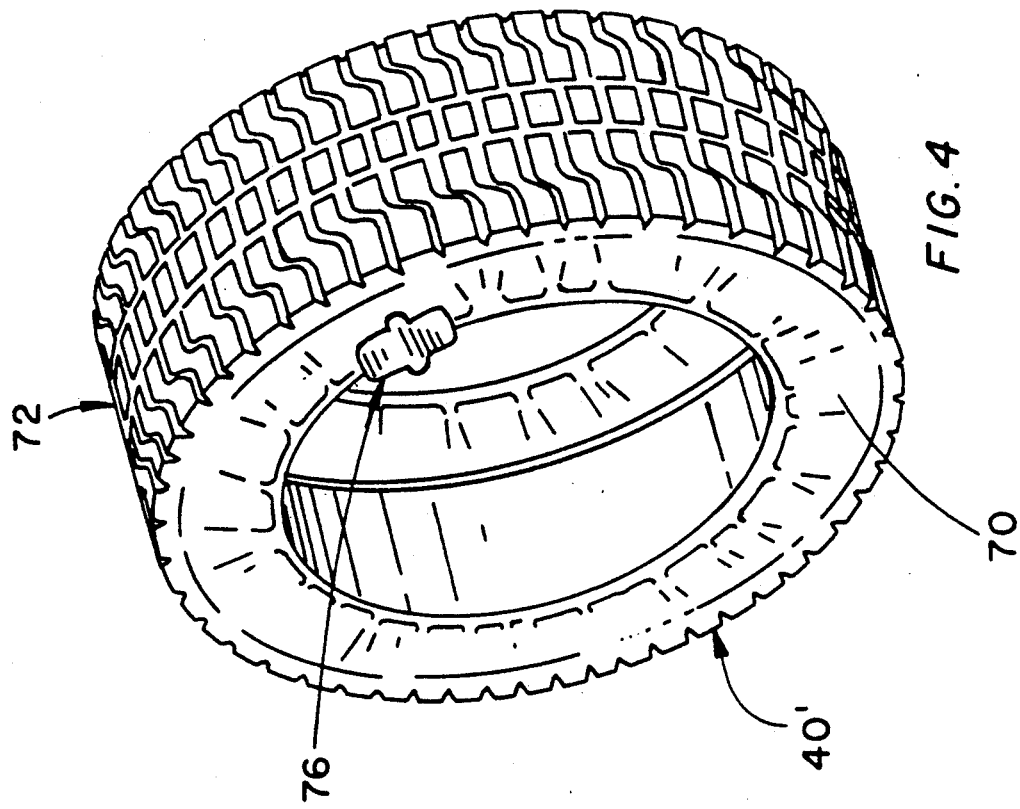
FIG. 4 is a perspective view of a second form thereof.

Shown in FIGS. 4 and 5 is a second form of the invention in which a flexible, side cover 70 extends from the tread section 72 and has a hem 74 defined on an inner periphery thereof, and includes an elastic band 75 therein. A turnbuckle or screwbuckle 76 is also included to tighten the elastic band about the tire if suitable.

It is understood that while certain forms of the present invention have been illustrated and described herein, it is not to be limited to the specific forms or arrangements of parts described and shown.

I claim:

1. A cover for a lawnmower tire having a worn thread comprising:
   A) said cover being one-piece and stretchable and including
      (1) an annular sidewall portion comprised of nylon stretch material and having an outer edge and an inner edge, said inner edge being formed of stretch cord and defining an opening, said annular side wall covering an entire sidewall portion of a lawnmower tire, and
      (2) a tread portion having an inner surface and an outer surface and being attached to said cover annular sidewall portion inner edge;
   B) tread on said cover tread portion outer surface;
   C) adhesive material on said tread portion inner surface, said adhesive material entirely covering said tread portion inner surface; and
   D) backing material releasably mounted on said adhesive material and including at least two portions with a first portion of said backing material extending ninety degrees about said tread portion inner surface and a second portion extending more than two hundred and seventy degrees about said tread portion inner surface, said first portion having an end edge positioned adjacent to an end edge of said second portion, with said second portion end edge overlapping said first portion end edge and forming a pull tab.

2. The tire assembly defined in claim 1 wherein said tab portions overlap a portion of an adjacent backing material section.

3. The cover defined in claim 2 wherein said adhesive is a synthetic rubber adhesive.

4. The cover defined in claim 3 wherein said adhesive is a pressure-sensitive adhesive.

5. The cover defined in claim 3 in which said annular sidewall is flexible and includes a hem on an inner edge thereof.

6. The cover defined in claim 5 further including an elastic band contained in said hem.

7. The cover defined in claim 6 further including a turnbuckle mounted on said elastic band.

* * * * *